United States Patent [19]

Yamamoto et al.

[11] 4,029,830
[45] June 14, 1977

[54] METHOD OF MANUFACTURING INSULATED ELECTRIC POWER CABLES

[75] Inventors: Shuji Yamamoto; Setsuya Isshiki; Mitsuru Igarashi, all of Tokyo, Japan

[73] Assignee: The Fujikura Cable Works, Ltd., Tokyo, Japan

[22] Filed: May 1, 1975

[21] Appl. No.: 573,425

[30] Foreign Application Priority Data

July 25, 1974 Japan .............................. 49-85418
Aug. 22, 1974 Japan .............................. 49-96549
Aug. 22, 1974 Japan .............................. 49-96550
Oct. 14, 1974 Japan .............................. 49-117942

[52] U.S. Cl. .......................... 427/57; 174/102 SC; 174/105 SC; 174/110 A; 174/110 PM; 174/120 C; 174/120 SC; 174/120 SR; 427/118; 427/120; 427/377; 427/388 R; 428/375
[51] Int. Cl.² .......................................... B05D 5/12
[58] Field of Search ............ 427/57, 117, 118, 120, 427/372, 377, 384, 385, 388, 407, 409; 174/102 SC, 105 R, 105 SC, 107, 110 R, 110 A, 110 SR, 110 PM, 120 R, 120 C, 120 SC, 120 SR; 428/375, 379, 380, 383, 461, 463, 515, 516, 518, 520, 522, 523

[56] References Cited

UNITED STATES PATENTS

| | | | |
|---|---|---|---|
| 3,096,210 | 7/1963 | Boonstra | 427/120 X |
| 3,171,866 | 3/1965 | Meyer et al. | 427/120 X |
| 3,684,821 | 8/1972 | Miyauchi et al. | 427/118 X |
| 3,793,476 | 2/1974 | Misiura et al. | 174/102 SC |

*Primary Examiner*—Thomas J. Herbert, Jr.
*Assistant Examiner*—Bruce H. Hess
*Attorney, Agent, or Firm*—Toren, McGeady & Stanger

[57] ABSTRACT

Insulated electric power cables comprising a cured insulating material applied over a conductor and a layer of plastic compound comprising 100 parts by weight of a thermoplastic resin and 5–70 parts by weight of calcium oxide as a moisture-absorbing agent, overlying the insulating material and, optionally, lying between the conductor and the insulating material. The presence of calcium oxide serves to absorb steam before it penetrates into the insulating material through the layer of plastic compound being cured by steam, whereby the cured insulating material is free of microvoids and possess good insulation characteristics.

8 Claims, 6 Drawing Figures

1

METHOD OF MANUFACTURING INSULATED ELECTRIC POWER CABLES

BACKGROUND OF THE INVENTION

This invention relates to electric power cables and a method of making same.

Certain techniques are already known for manufacturing electric power cables with cured polyethylene as the insulating material. According to one general operation, a mixture of curable polyethylene and a curing agent extruded to cover the surfaces of a electric conductor is cured by saturated steam and subsequently subjected to cooling by water. Saturated steam as the heating medium in this operation is used by virtue of its low degree of laminar film resistance, good thermal conductivity and great heat capcity as well as its moderate price and ready availablity.

The above prior art technique is disadvantageous due to the invasion of steam into the polyethylene insulating material during the curing process, which forms many watery areas, or the so called cloudy zones having micro-voids which will inevitably cause the cured polyethylene layer to lose its insulation properties. Such a disadvantage has, of late years, proved to be more and more critical due to the recently increasing need for high-voltage power transmission cables.

OBJECTS OF THE INVENTION

Accordingly, it is an object of the invention to provide electric power cables having excellent insulation properties and which are free of the disadvantage described above.

It is another object of the invention to provide a method for producing such electric power cables by speeding up the conventional curing reaction, using saturated stream, at a low cost.

It is still another object of the invention to produce such electric power cables having a suitable insulating layer which can withstand the invasion of water during the curing process and even thereafter.

SUMMARY OF THE INVENTION

The above objects and advantages can be realized in accordance with this invention by coating an electric conductor with crosslinked polyethylene and providing overlyingly a layer of a plastic compound comprising 100 parts by weight of a thermoplastic resin and from 5 to 70 parts by weight of calcium oxide, or by additionally providing a layer of the same plastic compound between the surface of the conductor and the polyethylene coating.

BRIEF DESCRIPTION OF THE DRAWINGS

The accompanying drawings show certain forms of the electric power cables manufactured in accordance with the method of the present invention.

DETAILED DESCRIPTION OF THE INVENTION

Figure 1:
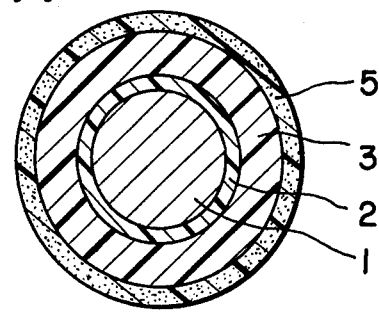
FIG. 1 is a sectional view showing one embodiment of the invention wherein conductor 1 is covered with an inside semiconductive layer 2, overlying which are a cured polyethylene insulation layer 3 and further a plastic layer 5 in which calcium oxide as the moisture-absorbing agent is blended.

The presence of calcium oxide in the layer of plastic compound provided on electric conductors in accordance with this invention serves to give an insulation layer of polyethylene which is free of microvoids. The formation of micro-voids within the insulation layer is usually attributable to the invasion of steam during the curing process, using saturated steam as the heating medium. But when the calcium oxide-containing layer is provided over the insulation layer or between the conductor and the insulation layer, any invading steam can be caught or absorbed by the calcium oxide, serving in this case as the moisture-absorbing agent.

The moisture-absorbing agents, which mean any substances capable of absorbing moisture by either chemical or physical action, used in accordance with the invention are exemplified by the following: Calcium oxide, magnesium oxide, calcium sulfate, copper sulfate, potassium hydroxide, magnesium perchlorate, barium perchlorate, calcium chloride, zinc chloride, calcium bromide, zinc bromide, phosphorous pentoxide, activated alumina, silica gel, carbon black, and water-reactive silicone and titanium compounds. Among these moisture-absorbing agents, the most suitable is calcium oxide because of its easiness of obtaining and moderation in price as well as its good reactivity with water.

In order to demonstrate the better moisture-absorbing effects of calcium oxide over the other moisture-absorbing agents, the following tests have been carried out by the inventors.

To each of four semiconductive plastic compounds A, B, C, and D, consisting of 65 parts by weight of a ethylene-vinyl acetate copolymer and 35 parts by weight of electroconductive carbon black was added a different moisture-absorbing agent in an amount as specified in Table I, with one other plastic compound E including no moisture-absorbing agent. These mixtures were molded into sheets 1.5 mm thick. The sheets containing the same moisture-absorbing agent were adhered to both sides of a curable polyethylene sheet 10 mm thick and pressed together with heat at 160° C over a period of 40 minutes, to produce a cured laminate. These laminates were exposed to steam heated to 160° C over a period of 40 minutes under a pressure of 5 kg/cm² by way of Test I or 180° C under a pressure of 10 kg/cm² by way of Test II. The thus treated laminates were cut into slices, each 1 mm thick, the transparency of which was obsarbed. Separately, portions of the cured polyethylene were tested to determine their water contents by Karl Fischer's method. The results are set out in Table I.

Table I

| Semiconductive plastic compound, parts by weight | A 100 | B 100 | C 100 | D 100 | E 100 |
|---|---|---|---|---|---|
| Moisture-absorbing agent, parts by weight | CaO 20 | MgO 20 | SiO₂gel 20 | CaSO₄ 20 | None |
| Test I: | | | | | |
| Transparency | Good | Good | Good | Good | Very poor |
| Water content, p.p.m. | 208 | 314 | 251 | 294 | 1,711 |
| Test II: | | | | | |
| Transparency | Good | Fairly good | Fairly good | Fairly good | Very poor |
| Water content, p.p.m. | 308 | 829 | 790 | 862 | 1,811 |

It can be concluded in view of the rate of increase in water content in the calcium oxide-containing material smaller than that of the other moisture-absorbing agent-containing materials, as is interpreted from the above results that calcium oxide is the most suitable moisture-absorbing agent for the purpose of this invention.

Illustrative of the thermoplastic resins constituting the plastic compound of the present invention are saturated or unsaturated olefin polymers and ethylenevinyl acetate copolymer with or without vinyl chloride grafting. The above-mentioned saturated or unsaturated olefin polymers may be selected from polymeric compounds, such as, polyethylene, polypropylene, ethylene-propylene rubber, and ethylene-propylene terpolymer.

Calcium oxide being the moisture-absorbing agent in accordance with the present invention should have a particle size of 50 μm (the average diameter) or less. Then usual calcium oxide available on the market that has been treated or coated with an ester a of higher fatty acid does not exhibit a sufficient reactivity or absorptivity to steam or moisture. Therefore, calcium oxide having no surface treatment is preferred according to this invention. With respect to the particle size of the calcium oxide, a smaller size is preferred since the smaller it is, the greater surface area per unit weight and, the richer it is in its reactivity or moisture-absorptivity.

According to the present invention, calcium oxide as the moisture-absorbing agent must be included in the plastic compound in an amount of from 5 to 70 parts by weight base on 100 parts by weight of the thermoplastic resin. This is because the absorptivity would become unnoticeable if the amounts are less than the above-defined range, and the extruding process during the practical cable manufacturing operation would be impaired if there was more than the defined range.

In order to show the criticality of the quantitywise range of calcium oxide, the following tests were conducted:

To the same semiconductive plastic compound as used in the above tests were added varied amounts of calcium oxide as indicated in Table II to follow.

Each of these compounds was molded to form a set of sheets about 1.5 mm thick. Each set was adhered to both sides of a curable polyethylene sheet 10 mm thick and pressed together with heat at 160° C for 40 minutes, to prepare 4 different samples. Each sample was then exposed to steam kept under a pressure of 5 kg/cm² at 160° C over an additional period of 40 minutes and, thereupon, cut into slices, each 1 mm thick.

The transparency and water content of each sample were determined by the same manner as employed in the previous tests. The results are shown in Table II.

The various physical properties of the calcium oxide-containing plastic compounds were measured, the results being set out also in the same table.

Table II

| Sample | F* | G | H | I* |
|---|---|---|---|---|
| Amount of semiconductive plastic compound, parts by weight | 100 | 100 | 100 | 100 |
| Calcium oxide, parts by weight | 3 | 10 | 60 | 80 |
| Transparency | Poor | Fair | Good | Good |
| Water content, p.p.m. | 1,531 | 715 | 184 | 169 |
| Volume resistivity, ohm-cm | 2 × 10³ | 3 × 10³ | 4 × 10⁴ | 8 × 10⁵ |
| Elongation, % | 450 | 430 | 220 | 150 |
| Tensile strength, kg/sq.mm | 1.4 | 1.4 | 0.8 | 0.4 |
| Mooney viscosity, ML₂₊₃ (120° C) | 32 | 33 | 48 | 65 |
| Out-look of extruded material | Good | Good | Fair | Poor |

*Control.

It is evident from the above test results that the semiconductive compounds tend to possess poor transparency and cloudy zones occur when calcium oxide is used in amounts less than the defined range, or a greater volume resistivity and a worsened workability when calcium oxide is used in amounts more than the defined range.

It is another discovery of the inventors that the addition of a curing agent to the semiconductive plastic compound comprising a thermoplastic resin and calcium oxide will exhibit the surprising effect of curing at an advanced rate and degree. Furthermore, the addition of the curing agent even, in a much smaller amount than conventionally used in the curing of polyethylene insulation layers, can produce a sufficient cure. Practical amounts of the curing agent in accordance with this invention are not more than half the amount added to the polyethylene insulation layers, or none particularly when a thin layer of plastic compound is to be formed form. Another surprising effect exerted by the curing agent added to the plastic compound may be that the advanced rate and degree of curing are not reduced even by the further addition of electroconductive carbon black.

In the manufacture of high-voltage power transmission cables of, say, more than 6,000 volts, a layer of a semiconductive resin produced by extrusion over the poylethylene insulation layer or between the polyethylene layer and the conductor is often provided so as to make the electrical stress uniform to avoid a partial discharge causing an electrical breakdown. The semiconductive resin suitable for the purpose is prepared by blending a base resin with a finely divided conductive compound, such as, carbon black, in an amount ranging from 40 to 90 parts by weight, preferably from 50 to 70 parts by weight, based on 100 parts by weight of the base resin. These electrical properties can also be produced by incorporating calcium oxide into the semiconductive resin layer. By so doing, the resinous semiconductivity and moisture-absorptivity are imparted to the resin layer. The provision of such semiconductive and moisture-absorbing layer in the manufacture of electric power cables serves to simplify their construction and avoid the occurrence of cloudy zones.

In this connection, it may be added that semiconductive plastic compounds containing calcium oxide as the moisture-absorbing agent and but not containing a curing agent tend to have poor their mechanical characteristics and semiconductivity when exposed to steam. On the other hand, containing of a curing agent exhibit little lowering of their mechanical characteristics and semiconductivity.

In view of the above, the insulated cables in accordance with this invention may be produced by way of simultaneously curing, in steam, the two layers of the uncured polyethylene insulation over the conductor and overlying semiconductive plastics, with or without a curing agent, extruded in turn or simultaneously, or the 3 layers of the uncured semiconductive plastics over the conductor, overlying the uncured polyethylene insulation, and uncured semiconductive plastics, extruded in turn or simultaneously.

The curing agents suitable for incorporation into the steam-absorbing layer in accordance with this invention are exemplified by organic peroxides, such as, dicumylperoxide, 2,5-dimethyl-2,5-di(t-butylperoxy) hexane, 2,5-dimethyl-b 2,5-di(t-butylperoxy)hexene, and di-t-butylperoxyisopropylbenzene.

According to the invention, the steam-absorbing layer comprising a thermoplastic resin and calcium oxide can be provided both between the conductor and the insulation layer and over the insulation layer, so that the insulated cables may be protected from eventual invasion of steam or moisture into or through the insulation layer, thereby to keep the insulation layer safe from the occurrence of insulation breakdown or water-treeing.

The method of making electric cables of the simplest construction in accordance with this invention comprises forming a layer of curable polyethylene upon the conductor to be insulated and, simultaneously or subsequently, covering the curable polyethylene layer with a plastic compound comprising a thermoplastic resin and calcium oxide in the form of a layer, followed by the curing of these two layers by high-pressure steam. By so doing, any steam entering the plastic layer from the outside can be caught or absorbed by calcium oxide present therein, and prevented from further penetration, thus avoiding the formation of cloudy zones within the cured polyethylene layer In the production of cured polyethylene insulated cables, the steam pressure employed is in the range of from 1.5 to 20 kg/cm$^2$, and the cure time varies within a wide range depending upon the insulation thickness and conductor size. The greater the insulation thickness and conductor size, the longer is the cure time, or the period of time in which the curable polyethylene-coated cable is exposed to steam, which can result in the formation of cloudy zones within the polyethylene insulation layer. In order to avoid this phenomenon, it is necessary to make the thickness of the overlying vapor-absorbing layer greater as the exposure time is increased.

It should be added in this connection that when a faster rate of curing is desired, ultrasonic waves, for example, may be employed in combination with steam as the heating medium. It should also be added that the vapor-absorbing layer may be removed after the underlying insulation layer has been cured, or if it remains unremoved, it may be covered with a sheath.

When a horizontal-type apparatus is used for continuously curing a polyethylene insulated cable comprising a large size wire with a slow curing rate, the cable passing within a curing tube tends to dip and come to contact with the inner wall of the curing tube, resulting in injury to its outermost surface, i.e., the outer semiconductive layer. In order to avoid such an undesired result, it has been usual to cure the outer semiconductive layer also. This can be easily met by the application of the present invention, i.e., by incorporating into the compound constituting the semiconductive layer calcium oxide and a curing agent in an amount smaller than that contained in the insulation layer, to increase the curing rate and the speed of the passing cable, to keep it from touching the inner wall of the curing tube.

Further according to the invention, no discoloration takes place on the conductor or wire during the curing process. Usually, copper changes its inherent color to dark purple or dark brown when heated at more than 100° C in an atmosphere where air and moisture are coexistent. The invention proposes in this connection to provide a vapor-absorbing layer over the insulation layer so that the vapor-absorbing layer may absorb all of vapor responsible for such coloration so that it does not reach the underlying conductor.

Figure 2:
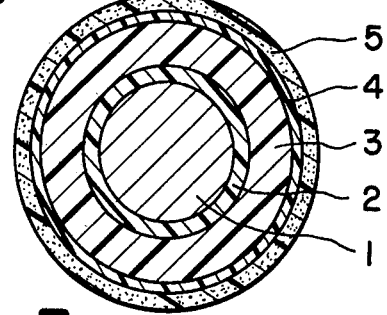
FIG. 2 is a sectional view also showing a modifed embodiment of FIG. 1, in which an outer semiconductive layer 4 is placed between the cured polyethylene insulation layer 3 and the plastic layer 5.

Now, referring to the drawings, FIG. 1 shows the insulated cable in accordance with this invention consisting of conductor 1, an overlying cable core composed of inside semiconductive layer 2 and cured polyethylene insulation layer 3, and calcium oxide-containing plastic layer 5 as the outermost layer. FIG. 2 shows another embodiment of the insulated cable additionally including an outer semiconductive layer 4 between cured polyethylene layer 3 and calcium oxide-containing plastic layer 5. The presence of this outer semiconductive layer 4 serves to improve the properties the of finished electric power cables.

Figure 3:
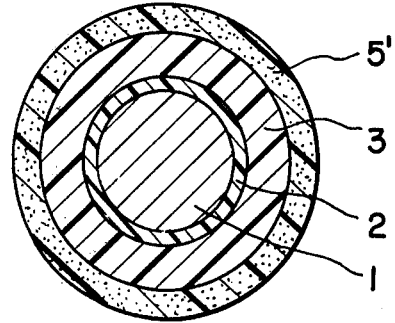
FIG. 3 is a sectional view showing a modified embodiment of FIG. 2, in which the outer semiconductive layer 4 and the plastic layer 5 have been unified as denoted by 5', to form a new outer semiconductive layer containing a moisture-absorbing agent.
Figure 4:
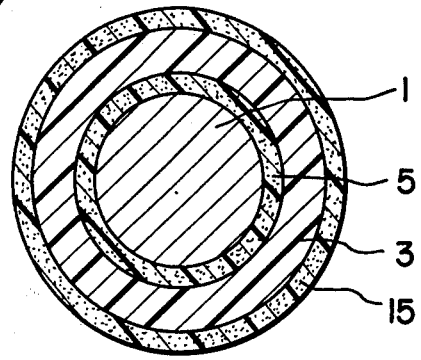
FIG. 4 is a sectional view of showing a cable having the above-mentioned conductor 1, plastic layer 5, insulation layer 3 and, additionally another plastic layer containing a moisture-absorbing agent, denoted by 15, each overlying in turn.

FIG. 3 shows a modified embodiment of FIG. 2, in which a new calcium oxide-containing plastic layer 5 is provided to form the outermost semiconductive layer unified by the above-mentioned layers 4 and 5. The cable in accordance with FIG. 3 is simpler in construction than that of FIG. 2 but is capable of exhibiting similar properties. FIG. 4 shows a further embodiment of the cable having the above-mentioned conductor 1, calcium oxide-containing plastic layer 5, and insulation layer 3, overlying which is provided a calcium oxide-containing plastic layer 15.

Figure 5:
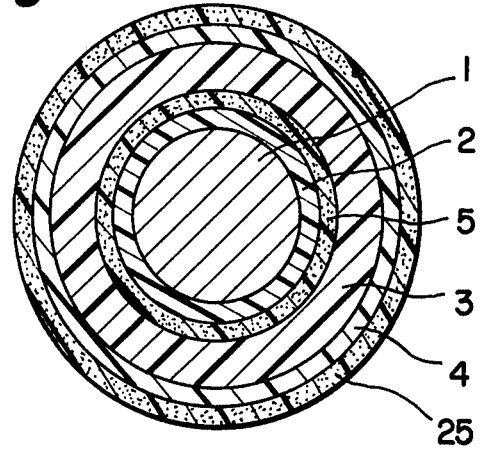
FIG. 5 is a sectional view showing another embodiment of the invention wherein the above-mentioned conductor 1, inner semiconductive layer 2, plastic layer 5, cured insulation layer 3, outer semiconductive layer 4 and additionally another plastic layer containing a moisture-absorbing agent, denoted by 25, sequentially one another.
Figure 6:
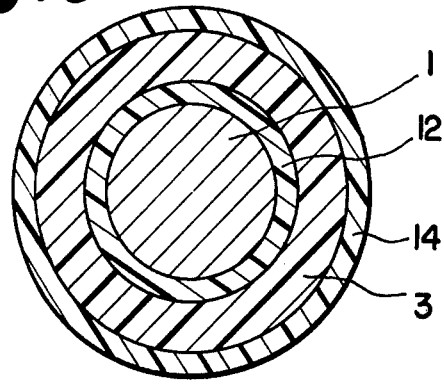
FIG. 6 is a sectional view showing a modified embodiment of FIG. 5, in which the inner semiconductive layer 2 and the plastic layer 5 have been unified as denoted by 12, laid on conductor 1 to form a new inner semiconductive layer containing a moisture-absorbing agent, and the outer semiconductive layer 4 and the plastic layer 25 have been unified as denoted by 14, over the cured insulation layer 3, to form a new outer semiconductive layer containing a moisture-absorbing agent.

FIG. 5 shows a still further embodiment consisting of the above-mentioned conductor 1, inner semiconductive layer 2, calcium oxide-containing plastic layer 5, insulation layer 3, and outer semiconductive layer 4, each overlaid in turn, and another calcium oxide-containing plastic layer 25 as the outermost layer. FIG. 6 is a modification to FIG. 5, in which layers 2 and 5 are unified to form a new calcium oxide-containing plastic layer 12, and layers 4 and 25 are unified to form a new calcium oxide-containing plastic layer 14, with insulation layer 3 being positioned between those new layers 12 and 14.

The present invention will now be more completely illustrated with the aid of the following specific, but non-limiting examples. In the examples, parts are all parts by weight.

EXAMPLE 1

Five conductors each, composed of 19 twisted copper wires, each 2.6 mm in diameter, were coated with a curable polyethylene elastomer containing 2% of dicumylperoxide as the curing agent by means of extrusion to form a layer 8 mm thick. Upon each of the thus prepared cable cores, a 1.5 mm thick layer of semiconductive compound 1,2,3,4, or 5, as specified in Table III was formed by means of extrusion. These layers were then cured in the atmosphere of saturated steam at about 180° C under a pressure of 10 kg/cm$^2$. Then the cured insulation and semiconductive layers were taken off the cable core and cut along their laminating direction, to give slices 1 mm thick. The transparency of the slives was observed and the moisture absorption was determined by Karl Fischer's method.

Table III

| | Semiconductive Compound | | | | |
|---|---|---|---|---|---|
| | 1 | 2 | 3 | 4 | 5* |
| Semiconductive plastic compound, parts | 100 | 100 | 100 | 100 | 100 |
| Calcium oxide, parts | 20 | 0 | 0 | 0 | 0 |
| Magnesium oxide, parts | 0 | 20 | 0 | 0 | 0 |
| Silica gel, parts | 0 | 0 | 20 | 0 | 0 |
| Calcium sulfate, parts | 0 | 0 | 0 | 20 | 0 |
| Transparency | Good | Fairly good | Fairly good | Fairly good | Very poor |
| Water content, p.p.m. | 308 | 829 | 790 | 862 | 1,811 |

Note: The semiconductive plastic compound consists of 65 parts of ethylene-vinyl acetate copolymer and 35 parts of carbon black.
*Control.

It can be observed from the above table that the use of calcium oxide as the moisture-absorbing agent exhibits the least vapor absorption compared to the cases where the other moisture-absorbing agents are used, even though non-use of the moisture-absorbing agent results in a far more absorption.

EXAMPLE 2.

To 100 parts of a ethylene-vinyl acetate copolymer was added each of the various kinds of calcium oxide as specified in Table IV to follow. The mixtures were molded into sheets about 1 mm thick. Each sheet was adhered to and pressed on each side of a cured polyethylene sheet. The resulting laminates 6,7,8,9,10, and 11 were then exposed to steam heated to 160° C under a pressure of 5 kg/cm$^2$ over a period of 40 minutes and, thereupon, their transparency and moisture-absorption were determined by the same manner as adopted in Example 1. The results are also set out in Table IV, together with the physical properties of each laminate.

Table IV

| | Sample of Laminate | | | | | |
|---|---|---|---|---|---|---|
| | 6 | 7 | 8 | 9 | 10 | 11 |
| Ethylene-vinyl acetate copolymer, parts | 100 | 100 | 100 | 100 | 100 | 100 |
| Calcium oxide A, parts | 0 | 30 | 0 | 0 | 0 | 0 |
| Calcium oxide B, parts | 0 | 0 | 30 | 0 | 0 | 0 |
| Calcium oxide C, parts | 0 | 0 | 0 | 30 | 0 | 0 |
| Calcium oxide D, parts | 0 | 0 | 0 | 0 | 30 | 0 |
| Calcium oxide E, parts | 0 | 0 | 0 | 0 | 0 | 30 |
| Transparency | Poor | Excellent | Good | Good | Fair | Fair |
| Water content, p.p.m. | 1,750 | 191 | 453 | 615 | 829 | 894 |
| Elongation, % | 450 | 310 | 105 | 300 | 420 | 435 |
| Tensile strength, kg/sq.mm | 1.3 | 1.2 | 0.8 | 1.1 | 1.0 | 0.9 |

Notes:
(a) Calcium oxide A is an untreated particulate material having a particle size of 50 μm or less.
(b) Calcium oxide B is an untreated particulate material having a particle size of 51 μm or more.
(c) Calcium oxide C is an aliphatic acid-treated particulate material having a particle size of 50 μm or less.
(d) Calcium oxide D is a plasticizer-treated particulate material having a particle size of 50 μm or less.
(e) Calcium oxide E is a process oil-treated particulate material having a particle size of 50 μm or less.

EXAMPLE 3.

Calcium oxide A of Example 2 was added to each semiconductive compound consisting of 65 parts of an ethylene-vinyl acetate copolymer and 35 parts of carbon black in an amount as indicated in Table V. These mixtures were treated by the same procedures as in Example 2, and the resultant samples of laminates 12, 13, 14, and 15 were analyzed with respect to their transparency and moisture absorption. The results are set out in Table V, together with the physical properties of each laminate.

Table V

| | Sample of Laminate | | | |
|---|---|---|---|---|
| | 12 | 13 | 14 | 15 |
| Semiconductive compound, parts | 100 | 100 | 100 | 100 |
| Calcium oxide, parts | 5 | 20 | 40 | 80 |
| Transparency | Very poor | A little poor | Good | Good |
| Moisture content, p.p.m. | 935 | 518 | 182 | 178 |
| Volume resistivity, ohm-cm | $1 \times 10^3$ | $3 \times 10^3$ | $6 \times 10^3$ | $5 \times 10^4$ |
| Elongation, % | 450 | 380 | 295 | 95 |
| Tensile strength, kg/sq.mm | 1.3 | 1.2 | 1.1 | 0.8 |
| Mooney viscosity, $ML_{3+3}$ (120° C) | 32 | 35 | 40 | 64 |
| Outlook of extruded material | Good | Good | Fair | Poor |

It may be observed from the above results that the addition of calcium oxide in an amount of 5 parts leads to a greater amount of water entering into the cured polyethylene insulation layer, causing cloudy zones therein, while a similar addition in amounts over 70 parts is presumed to bring about unsatisfactory results.

EXAMPLE 4.

Semiconductive compounds consisting of 65 parts of an ethylene-vinyl acetate copolymer and 35 parts of carbon black were mixed with calcium oxide and dicumylperoxide as indicated in Table VI. Each of these mixtures was molded into sheets 16, 17, 18, 19 20, and 21. These sheets were subjected to exposure to steam heated to 160° C under a pressure of 5.5 kg/cm$^2$ over a period of 40 minutes, and their properties were determined and set out in Table VI.

Table VI

|  | Sample of Sheet | | | | | |
| --- | --- | --- | --- | --- | --- | --- |
|  | 16 | 17 | 18 | 19 | 20 | 21 |
| Semiconductive compound, parts | 100 | 100 | 100 | 100 | 100 | 100 |
| Calcium oxide, parts | 0 | 0 | 30 | 30 | 30 | 30 |
| Dicumylperoxide, parts | 0 | 2 | 0 | 0.1 | 1.0 | 3 |
| Mooney scorching time, min. | — | 15 | — | 20 | 13 | 7 |
| Gel fraction, % | — | 85 | — | 65 | 95 | 98 |
| Water absorption, % | 3 | 2 | 15 | 10 | 8 | 7 |
| Tensile strength, kg/sq.mm | 1.3 | 1.6 | 0.6 | 1.5 | 1.8 | 2.1 |
| Elongation, % | 350 | 300 | 35 | 280 | 250 | 180 |
| Volume resistivity at 25° C, ohm-cm | 5 × 10$^3$ | 4 × 10$^3$ | 6 × 10$^3$ | 5 × 10$^3$ | 4 × 10$^3$ | 5 × 10$^3$ |
| Volume resistivity at 90° C, ohm-cm | 3 × 10$^4$ | 9 × 10$^3$ | 1 × 10$^6$ | 9 × 10$^4$ | 9 × 10$^3$ | 8 × 10$^3$ |

The data contained in the above table, the following may particularly be interpreted.

a. The semiconductive compound without calcium oxide can not induce a sufficient cure unless dicumylperoxide as the curing agent is added in an amount of 2 % or so, which is about the same as the amount added to the insulating material (see sample 17).

b. The presence of a slight amount, i.e., 0.1 part of dicumylperoxide as a curing agent together with calcium oxide cures the semiconductive material to a degree as high as 65% (see sample 19).

c. The presence of an increased amount, i.e., 3 parts of dicumylperoxide leads to the reduction of scorching time, the completion of cure during the course of the molding process, and the discontinuation of extrusion (see sample 21).

d. The inclusion of dicumylperoxide as the curing agent into the semiconductive compound contributes to the much superior mechanical properties, compared to those obtained in the absence of the curing agent (see samples 20 and 18).

e. The cured calcium oxide-containing semiconductive sheet has a less water absorption than the uncured one due to its network structure and also to its minimal swelling ability in water (compare sample 20 with sample 18).

f. Volume resistivity makes no great difference between the cured calcium oxide-containing semiconductive and uncured sheets at room temperature. However, at an elevated temperature, say, 90° C, the volume resistivity of the cured sheet does not increase as much as that of the uncured sheet but remains stable. (Compare sample 20 with sample 18.) Incidentally, it was observed when the volume resistivity was measured at 90° C that many swollen areas were formed on the surface of the uncured sheet due to evaporation of the water inside, while none of such phenomena took place on the cured sheet.

It is further known from the above that the calcium oxide-containing semiconductive compound that has not been cured possesses poorer mechanical properties and semiconductivity. And yet that the calcium oxide-containing semiconductive compound can be sufficiently cured by the presence of the curing agent in an amount equal to or less than half the amount of curing agent contained in the insulation layer, since the addition of calcium oxide itself displays a cure-accelerating effect sufficient to complete the necessary cure in cooperation with part of the curing agent contained in and transferred from the insulation layer.

EXAMPLE 5.

A conductor having a cross-sectional area of 100 mm$^2$ was coated with curable polyethylene by means of extrusion to form an insulation layer 14 mm thick, and over the thus formd insulation layer, a mixture of 100 parts of a semiconductive compound consisting of an ethylene-vinyl acetate copolymer and carbon black with 30 parts of calcium oxide was applied by means of simultaneous extrusion, to form a semiconductive layer 1 mm thick. The cable cores thus obtained, 22–24, were subjected to curing by steam under varied values of pressure as indicated in Table VII, to produce cured polyethylene insulated cables of 66 kV. Each cable thus produced was measured with respect to the various properties as well as factors concerned as set out in Table VII.

For purposes of comparison, similar samples excepting that calcium oxide was excluded, i.e., 26 were tested in a similar manner, to obtain the results as set out in the same table.

Table VII

|  | Sample of Cable Core | | | | |
| --- | --- | --- | --- | --- | --- |
|  | 22 | 23 | 24 | 25 | 26* |
| Pressure of steam, kg/sq.cm | 5 | 10 | 15 | 20 | 15 |
| Manufacturing speed, m/min. | 0.3 | 0.5 | 0.8 | 0.9 | 0.8 |
| Gel fraction, % | 84 | 85 | 83 | 86 | 84 |
| Cloudy zones in the insulation layer | Nil | Nil | a few | a few | a lot |
| Water content in the insulation layer, p.p.m. | 205 | 210 | 560 | 850 | 1,800 |
| Water absorption by the semiconductive layer, % | 0.8 | 0.9 | 1.2 | 1.8 | 0.7 |
| Elongation of the outer semiconductive layer, % | 290 | 260 | 220 | 150 | 350 |
| Tensile strength of the semiconductive layer, kg/sq.mm | 1.5 | 1.4 | 1.2 | 1.0 | 1.4 |
| Breakdown voltage by alternating current, kV | 480 | 490 | 410 | 400 | 350 |
| Impulse breakdown voltage, kV | 920 | 900 | 830 | 810 | 800 |

Note: *Control.

It is shown by the above results that when a pressure of 5 or 10 kg/cm$^2$ is applied, no clouding zone occurs in the insulation layer, and much improved insulation breakdown characteristics are obtained compared to the case in which a higher pressure of 15 or 20 kg/cm$^2$ is applied. It is also observed that the application of a 15 kg/cm$^2$ pressure induces greater vapor absorption in the insulation layer.

It may be added in connection with the above tests that sample 23 could be made to increase its velocity of conductor from 0.5 m/min. to 0.8 m/min. by simultaneously applying ultrasonic waves having an output of 2 kW and a frequency of 400 kHz to heat the insulating layer from inside, resulting in a similar degree of cure to the case in which the steam pressure of 15 kg/cm$^2$ was applied.

EXAMPLE 6.

Each conductor having a cross-sectional area of from 600 to 1,000 mm$^2$ was coated with curable polyethylene by means of extrusion to form an insulation layer from 15 to 22 mm thick, and over the thus formed insulation layer a mixture of 100 parts of a semiconductive compound consisting of an ethylene-vinyl acetate copolymer and carbon black with 30 parts of calcium oxide was applied by means of simultaneous extrusion, to form a semiconductive layer from 1 to 1.5 mm thick. The cable core samples thus obtained, 27–29, were subjected to curing by irradiation with ultrasonic waves having an output of 3 kW and a frequency of 400 kHz in the presence of steam, to produce cured polyethylene insulated high-voltage cables. Each cable thus produced was measured with respect to the various properties as well as factors concerned as set out in Table VIII.

For purposes of comparison, the same samples 30–32 were subjected to a similar curing procedure with the exception that the application of the ultrasonic waves was omitted, and the results are also set out in Table VIII.

Table VIII

|  | Sample of Cable Core | | | | | |
|---|---|---|---|---|---|---|
|  | 27 | 28 | 29 | 30* | 31* | 32* |
| Voltage for the finished cable, kV | 66 | 77 | 154 | 66 | 77 | 154 |
| Size of conductor, sq.mm | 600 | 600 | 1000 | 600 | 600 | 1000 |
| Thickness of the insulation layer, mm | 15 | 17 | 22 | 15 | 17 | 22 |
| Thickness of the semiconductive layer, mm | 1.0 | 1.0 | 1.5 | 1.0 | 1.0 | 1.5 |
| Irradiation of ultrasonic waves | Yes | Yes | Yes | No | No | No |
| Cure time, min. | 15 | 20 | 30 | 24 | 31 | 45 |
| Transparency of the insulation layer | Good | Good | Good | Very poor | Very poor | Very poor |
| Water content in the insulation layer, p.p.m. | 182 | 189 | 193 | 850 | 1120 | 1540 |
| Breakdown voltage by alternating current, kV | 520 | 600 | 720 | 390 | 480 | 530 |
| Impulse breakdown voltage, kV | 970 | 1110 | 1590 | 850 | 910 | 1240 |

Note: *Control.

As is evident from the above data, specifically by comparing samples 27–29 to samples 30–32, the use of ultrasonic waves as the means of curing in combination with steam serves to shorten the cure time, or production time by about two-thirds, the improved dielectric strength of the finished cable as well as the very scarce permeation of vapor into the insulation layer.

EXAMPLE 7.

Each conductor having a cross-sectional area of from 100 to 1,500 mm$^2$ was coated with a curable polyethylene containing 2% of dicumylperoxide by means of extrusion to form an insulation layer from 14 to 22 mm thick, and over the thus formed insulation layer, a mixture of 100 parts of a semiconductive compound consisting of an ethylene-vinyl acetate copolymer and carbon black with 30 parts of calcium oxide was applied by means of simultaneous extrusion, to form a semiconductive material. The cable core samples thus obtained, 33–35, were then subjected to curing in the presence of steam, to give cured polyethylene insulated cables. Their various properties as well as the conditions used are set out in Table IX.

For purposes of comparison, a similar procedure was followed but the mixture excluded calcium oxide, e.g., refer to sample 36, 38, and 39, or the semiconductive layer was less thick, e.g., referred to sample 37. The results are shown also in Table IX.

Table IX

|  | Sample of Cable Core | | | | | | |
|---|---|---|---|---|---|---|---|
|  | 33 | 34 | 35 | 36* | 37* | 38* | 39* |
| Voltage for the finished cable, kV | 66 | 66 | 154 | 66 | 66 | 66 | 154 |
| Size of conductor, sq.mm | 100 | 600 | 1500 | 100 | 100 | 600 | 1500 |
| Thickness of the insulation layer, mm | 14 | 15 | 22 | 14 | 14 | 15 | 22 |
| Thickness of the semiconductive layer, mm | 1.5 | 2.0 | 2.0 | 2.0 | 0.5 | 2.0 | 2.0 |
| Cure time, min. | 15 | 24 | 55 | 15 | 15 | 24 | 55 |
| Transparency of the insulation layer | Good | Good | Good | Very poor | Very poor | Very poor | Very poor |
| Water content in the insulation layer, p.p.m. | 180 | 188 | 191 | 1760 | 1030 | 1820 | 1950 |
| Breakdown voltage by alternating current, kV | 480 | 510 | 720 | 330 | 350 | 380 | 540 |
| Impulse Breakdown voltage, kV | 930 | 960 | 1580 | 810 | 820 | 840 | 1250 |

Note:
*Control.
Samples 33, 34, 35 and 37 contained 30 % by weight of CaO.

As is evident from the above data, the finished cable in the class of 154 kV comprising a conductor having a cross-sectional area of 1,500 mm$^2$ had no vapor permeated into the insulation layer during the curing process with steam, nor any cloudy zones occurring in the layer, but has an improved dielectric strength when the semiconductive layer is as thick as 2 mm.

EXAMPLE 8.

An electric cable of 33 kV comprising a conductor having a cross-sectional area of 100 mm$^2$, a polyethylene insulation layer 8 mm thick, and inner and outer semiconductive layers, each 1 mm thick, of a mixture of 100 parts of a semiconductive compound with 30 parts of calcium oxide was kept immersed in water and charged with current of 10 kV and 1 kHz over a period of 30 days. Thereupon, the cable was measured with respect of the occurrence of water-treeing and breakdown voltage.

As a control, a similar test was carried out on the same electric cable as above excepting that calcium oxide was excluded from the semiconductive layer-forming mixture.

The results are shown in the following Table X.

Table X

|  | Present Invention | Control |
| --- | --- | --- |
| Occurrence of Water-treeing, piece/sq.mm | Nil | 7 |
| Breakdown voltage by alternating current, kV | 260 | 150 |
| Impulse breakdown voltage, kV | 720 | 480 |

The above data indicate that the presence of a moisture-absorbing agent, i.e., calcium oxide serves to prevent the occurrence of water-treeing and induces improved breakdown strength.

What is claimed is:

1. A method of manufacturing an insulated electric power cable comprising the steps of applying a curable polyethylene material on an electric conductor to form a polyethylene insulation layer, providing over said insulation layer, a layer of a plastic compound comprising 100 parts by weight of a thermoplastic resin and from 5 to 70 parts by weight of calcium oxide having an average diameter ≤ 50 μm and curing both the insulation layer and said layer of plastic compound at the same time with steam under a pressure of 1.5- 20 kg/cm², said thermoplastic resin being selected from the group consisting of saturated or unsaturated olefin polymers and ethylene-vinyl acetate copolymers with or without vinyl chloride grafting.

2. A method of manufacturing an insulated electric power cable comprising the steps of applying a curable polyethylene material on an electric conductor to form a polyethylene insulation layer, providing over said insulation layer, a layer of a plastic compound comprising 100 parts by weight of a thermoplastic resin composition containing 100 parts by weight of a thermoplastic resin, from 40 to 80 parts by weight of carbon black resin and from 5 to 70 parts by weight of calcium oxide having an average diameter ≤ 50 μm and curing both said insulation layer and said layer of plastic compound at the same time with steam under a pressure of 1.5–20 Kg/cm², said thermoplastic resin being selected from the group consisting of saturated and unsaturated olefin polymers and ethylene-vinyl acetate copolymers with or without vinyl chloride grafting.

3. The method as claimed in claim 1 wherein said plastic compound additionally contains a curing agent in an amount not exceeding half the amount of said curing agent in said curable polyethylene material.

4. The method as claimed in claim 2 wherein said semiconductive thermoplastic resin composition additionally contains a curing agent in an amount not exceeding half the amount of said curing agent in said curable polyethylene material.

5. The method as claimed in claim 1 wherein said steam is used in combination with ultrasonic radiation.

6. The method as claimed in claim 1 wherein said steam is used in combination with an ultrasonic radiation.

7. The method as claimed in claim 1 wherein said steam is used under a pressure of from 12 to 15 kg/cm².

8. The method as claimed in claim 2 wherein said steam is used under a pressure of from 2 to 15 kg/cm².

* * * * *

UNITED STATES PATENT OFFICE
CERTIFICATE OF CORRECTION

Patent No. 4,029,830      Dated June 14, 1977

Inventor(s) Shuji Yamamoto et al

It is certified that error appears in the above-identified patent and that said Letters Patent are hereby corrected as shown below:

In the heading of the patent [30] should read as follows:

--[30] Foreign Application Priority Data

| | | |
|---|---|---|
| May 4, 1974 | Japan | 49-50101 |
| July 25, 1974 | Japan | 49-85418 |
| Aug. 22, 1974 | Japan | 49-96549 |
| Aug. 22, 1974 | Japan | 49-96550 |
| Oct. 14, 1974 | Japan | 49-117942--. |

Signed and Sealed this sixteenth Day of August 1977

[SEAL]

Attest:

RUTH C. MASON
*Attesting Officer*

C. MARSHALL DANN
*Commissioner of Patents and Trademarks*